(12) United States Patent
Matsushita et al.

(10) Patent No.: US 8,708,855 B2
(45) Date of Patent: Apr. 29, 2014

(54) VEHICLE DRIVE SYSTEM

(75) Inventors: Junji Matsushita, Anjo (JP); Akira Isogai, Anjo (JP); Daisuke Iimura, Kashiba (JP); Hironari Toyoda, Nisshin (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 510 days.

(21) Appl. No.: 13/045,013

(22) Filed: Mar. 10, 2011

(65) Prior Publication Data

US 2011/0232786 A1    Sep. 29, 2011

(30) Foreign Application Priority Data

Mar. 29, 2010 (JP) ................. 2010-074876

(51) Int. Cl.
*B60K 11/02* (2006.01)

(52) U.S. Cl.
USPC .................. 475/159; 475/5; 310/52

(58) Field of Classification Search
USPC .............. 475/5, 159, 160; 184/6.12, 6.22; 74/467; 310/52, 53, 54, 58, 59
See application file for complete search history.

(56) References Cited

U.S. PATENT DOCUMENTS

| 5,217,085 | A | * | 6/1993 | Barrie et al. | 184/104.1 |
| 5,372,213 | A | * | 12/1994 | Hasebe et al. | 180/65.6 |
| 5,517,072 | A | * | 5/1996 | Hildebrandt | 310/228 |
| 6,443,278 | B1 | * | 9/2002 | Hori et al. | 192/3.58 |
| 7,059,443 | B2 | * | 6/2006 | Kira | 180/243 |
| 2004/0134693 | A1 | * | 7/2004 | Yamagishi et al. | 180/65.1 |

FOREIGN PATENT DOCUMENTS

| JP | A-2006-308017 | 11/2006 |
| JP | A-2007-278446 | 10/2007 |
| JP | A-2008-195233 | 8/2008 |
| JP | A-2009-136070 | 6/2009 |
| JP | A-2009-291002 | 12/2009 |

OTHER PUBLICATIONS

Mar. 29, 2011 International Search Report issued in PCT/JP2011/052207 (with translation).

* cited by examiner

*Primary Examiner* — Roger Pang
(74) *Attorney, Agent, or Firm* — Oliff PLC (57) ABSTRACT

A vehicle drive system, including a motor generator; a gear group having a plurality of gears; and a motor cooling circuit for cooling the motor generator. The system further includes a lubricating circuit for lubricating the gear group; a cooler circuit in which an oil cooler is provided; and an oil pump that supplies oil to each circuit. The motor cooling circuit is arranged in series with and downstream of the cooler circuit, and the lubricating circuit is arranged parallel to the cooler circuit with respect to the oil pump.

19 Claims, 6 Drawing Sheets

வாshould
VEHICLE DRIVE SYSTEM

INCORPORATION BY REFERENCE

The disclosure of Japanese Patent Application No. 2010-074876 filed on Mar. 29, 2010 including the specification, drawings and abstract is incorporated herein by reference in its entirety.

BACKGROUND OF THE INVENTION

The present invention relates to a vehicle drive system that includes a motor generator.

DESCRIPTION OF THE RELATED ART

In a vehicle drive system that includes a motor generator and is installed in a hybrid, electric, or other vehicle, the motor generator is incorporated inside a case. The motor generator generates heat while driving and must be cooled. This is because the generated heat lowers the performance of the motor generator.

Therefore, the vehicle drive system that includes the motor generator may also include a motor cooling circuit for supplying oil to cool the motor generator. In such a vehicle drive system, the motor generator is cooled by supplying oil discharged from an oil pump to the motor generator (mainly a stator core and a coil end) through the motor cooling circuit (see Japanese Patent Application Publication No. JP-A-2009-136070).

SUMMARY OF THE INVENTION

However, in addition to the motor cooling circuit, the vehicle drive system that includes the motor generator also requires a lubricating circuit for supplying oil to lubrication elements such as gears that are provided inside the drive system. In other words, this type of vehicle drive system needs both a lubricating circuit and a motor cooling circuit. Motor generators in recent years are achieving higher output, making efficient cooling of the motor generator increasingly important.

Here, the motor generator can be efficiently cooled by supplying a large amount of oil cooled by an oil cooler to the motor generator. That is, arranging the motor cooling circuit and the lubricating circuit in series with the oil cooler should be sufficient. However, while the motor cooling circuit necessitates a large flow of oil, a large flow of oil is not desirable for the lubricating circuit. This is because a large flow of oil in the lubricating circuit would increase the oil passing resistance of oil to be supplied to the hole portions of gears and shafts. Greater oil passing resistance in the lubricating circuit may result in circuit damage due to the increased hydraulic pressure inside the circuit (especially near the oil cooler), lower oil pump efficiency, and other problems.

The present invention was devised in order to solve the problems described above. It is an object of the present invention to provide a vehicle drive system that efficiently cools a motor generator and improves oil pump efficiency while suppressing an in-circuit hydraulic pressure increase.

An embodiment of the present invention devised to solve the problem described above is a vehicle drive system that includes a motor generator, a gear group having a plurality of gears, a motor cooling circuit for cooling the motor generator, a lubricating circuit for lubricating the gear group, a cooler circuit in which an oil cooler is provided, and an oil pump that supplies oil to each circuit. In the vehicle drive system, the motor cooling circuit is arranged in series with and downstream of the cooler circuit, and the lubricating circuit is arranged parallel to the cooler circuit with respect to the oil pump.

In the vehicle drive system, the motor cooling circuit is arranged in series with and upstream of the cooler circuit. Therefore, oil cooled by the oil cooler can be directly supplied to the motor cooling circuit. Here, the lubricating circuit is arranged parallel to the cooler circuit with respect to the oil pump. In the lubricating circuit, oil is supplied to the hole portions of gears and shafts, so the lubricating circuit has greater oil passing resistance than the motor cooling circuit. This facilitates the flow of oil discharged from the oil pump toward the motor cooling circuit so that a large flow of oil can be supplied to the motor cooling circuit.

Thus, since a large flow of cooled oil can be supplied to the motor cooling circuit, the motor generator can be efficiently cooled. In addition, since oil that has been cooled is used to cool the motor generator, the flow of oil supplied to the motor cooling circuit can be suppressed. Therefore, downsizing of the oil pump can also be achieved.

Here, because the motor cooling circuit has little oil passing resistance, the in-circuit hydraulic pressure does not increase even with a large oil flow. Meanwhile, although the lubricating circuit has large oil passing resistance, a large amount of oil does not flow to the lubricating circuit so the in-circuit hydraulic pressure does not increase. Accordingly, in the vehicle drive system, circuit damage can be suppressed and the efficiency of the oil pump can be improved while also suppressing a hydraulic pressure increase inside the circuits.

In the vehicle drive system described above, the lubricating circuit preferably has greater oil passing resistance than the motor cooling circuit and the cooler circuit.

This further facilitates the flow of oil discharged from the oil pump toward the motor cooling circuit so that a large flow of oil can be reliably supplied to the motor cooling circuit. Consequently, since a large flow of cooled oil can be reliably supplied to the motor cooling circuit, the motor generator can be cooled with even greater efficiency.

In the vehicle drive system described above, an upstream portion of the lubricating circuit is preferably provided with an orifice. Note that the upstream portion of the lubricating circuit refers to a portion up to where an oil passage for supplying oil to lubrication elements such as the gear group branches.

Providing an orifice in the upstream portion of the lubricating circuit enables easy control of a proportion of the oil flow of the motor cooling circuit to the oil flow of the lubricating circuit. Thus, since a required oil flow can be reliably supplied to the motor cooling circuit, the motor generator can be efficiently cooled.

The vehicle drive system described above preferably further includes a pressure regulating valve that regulates a pressure of oil discharged from the oil pump and supplied to each circuit. The pressure regulating valve preferably regulates such that a target flow of oil or more is supplied to the motor cooling circuit, and the pressure of the oil stays within a withstand pressure limit of each circuit. In addition, a discharge port of the pressure regulating valve is preferably connected to an intake port of the oil pump.

By providing this type of pressure regulating valve, a drop in the efficiency of the oil pump and circuit damage caused by a rise in hydraulic pressure inside the circuits can be reliably suppressed. Because the discharge port of the pressure regulating valve is connected to the intake port of the oil pump, oil discharged from the pressure regulating valve directly returns to the oil pump without returning to an oil pan. This decreases the amount of oil that the oil pump intakes from the oil pan, and the pressure loss when oil passes through a strainer can be reduced accordingly. Therefore, due to the improved efficiency of the oil pump, the oil pump can be downsized and manufacturing costs can be reduced.

In such case, the pressure regulating valve is preferably a relief valve that opens after the target flow of oil or more is supplied to the motor cooling circuit and before the pressure of oil supplied to each circuit reaches the withstand pressure limit of each circuit.

By using this type of relief valve, the reliability and durability of the pressure regulating valve can be increased and manufacturing costs can be reduced.

Consequently, it is possible to achieve improved performance and a cost reduction for the vehicle drive system.

In the vehicle drive system described above, a cover of the motor generator is preferably formed with an oil passage that connects to the oil pump, and at least part of a connection portion among the oil passage, the cooler circuit, and the lubricating circuit.

If the pressure regulating valve is provided, the cover of the motor generator is preferably formed with an oil passage that connects to the oil pump, and at least part of a connection portion among the oil passage, the cooler circuit, and the lubricating circuit, and provided with the pressure regulating valve.

Thus, components near the connection portion can be provided consolidated in the cover, which achieves good space efficiency and downsizing of the vehicle drive system. If the pressure regulating valve is provided, the connection portion and the pressure regulating valve are arranged near one another, which enables swift regulation of the hydraulic pressure of each circuit. Thus, an in-circuit hydraulic pressure increase can be reliably suppressed.

In the vehicle drive system described above, if the pressure regulating valve is provided, the cover of the motor generator is preferably provided with the oil pump, and a return oil passage that connects the discharge port of the pressure regulating valve and the intake port of the oil pump.

Thus, the return oil passage can be made short so that oil discharged from the pressure regulating valve can be efficiently returned to the oil pump. Therefore, the efficiency of the oil pump can be improved because of the improved return of oil.

According to a vehicle drive system of the present invention, as described above, a motor generator can be efficiently cooled while suppressing an in-circuit hydraulic pressure increase.

DETAILED DESCRIPTION OF THE EMBODIMENTS

Figure 1:
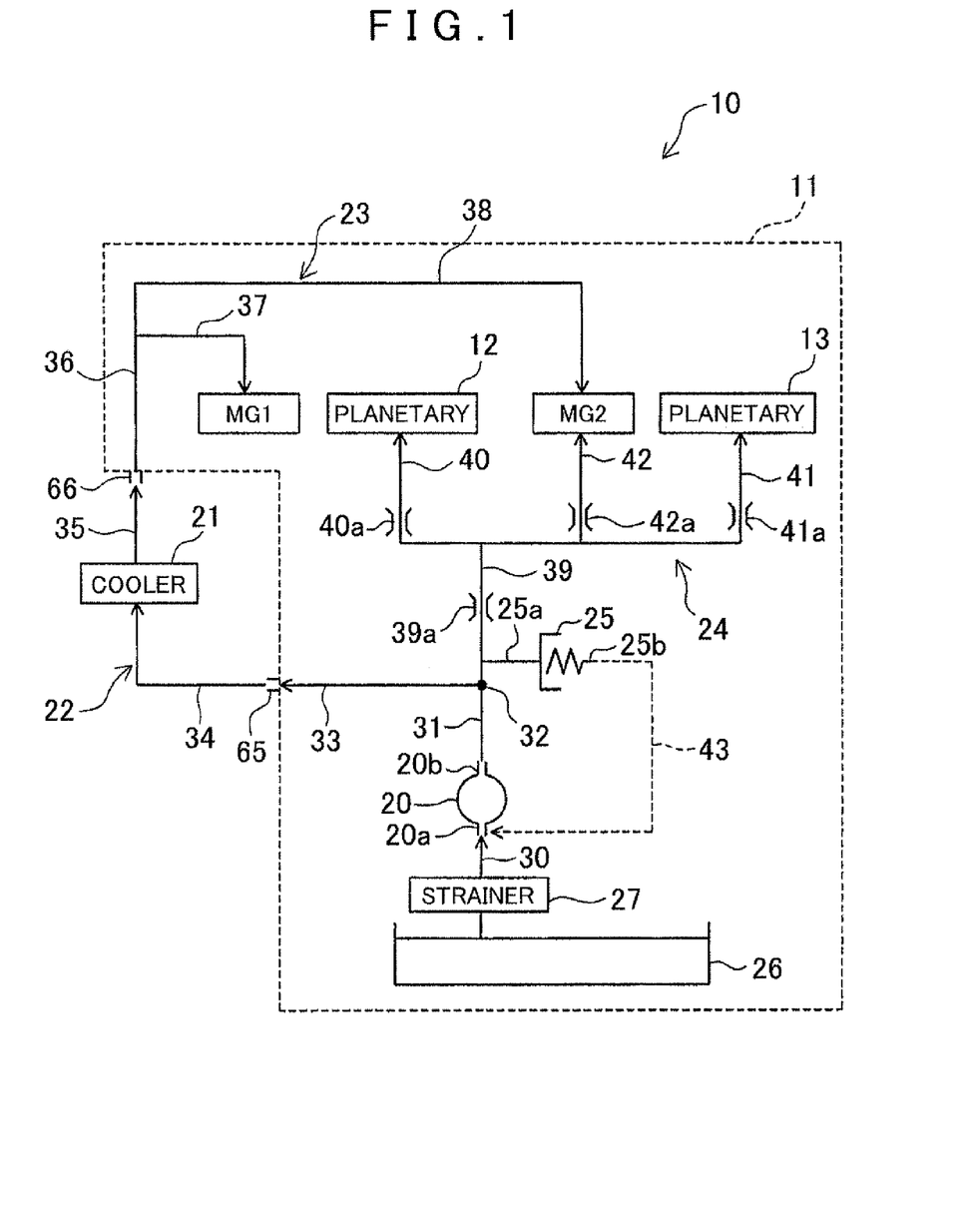
FIG. 1 is a drawing that shows the constitution of a hydraulic circuit of a drive system according to an embodiment.
Figure 2:
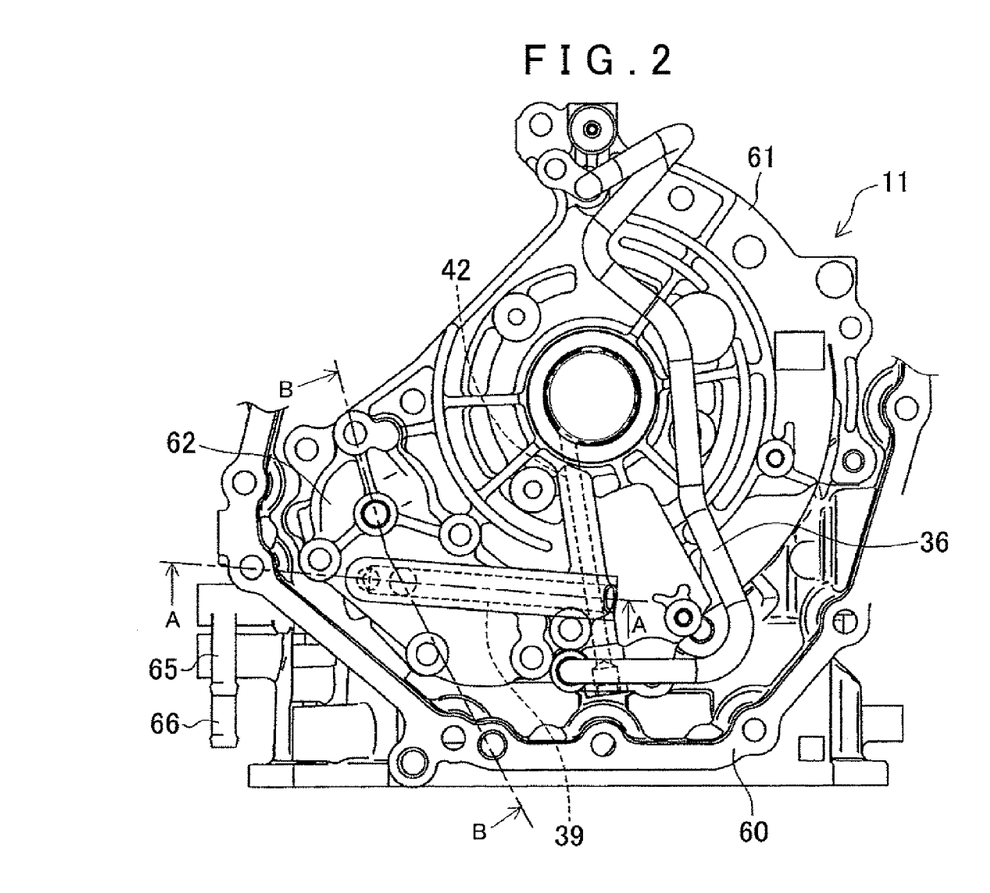
FIG. 2 is a drawing that shows the schematic constitution near a cover of a motor generator MG2 of a vehicle drive system as viewed from a front planetary gear unit side.
Figure 3:
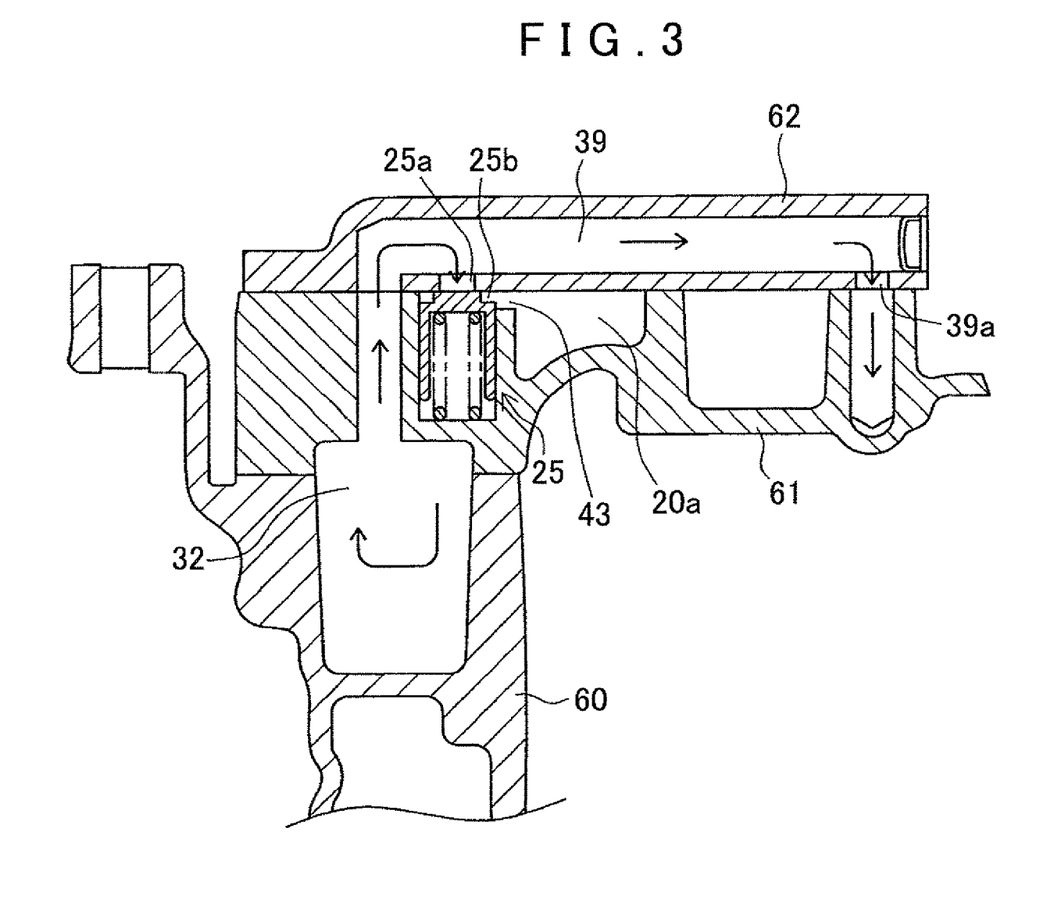
FIG. 3 is a cross-sectional view taken along a line A-A in FIG. 2.
Figure 4:
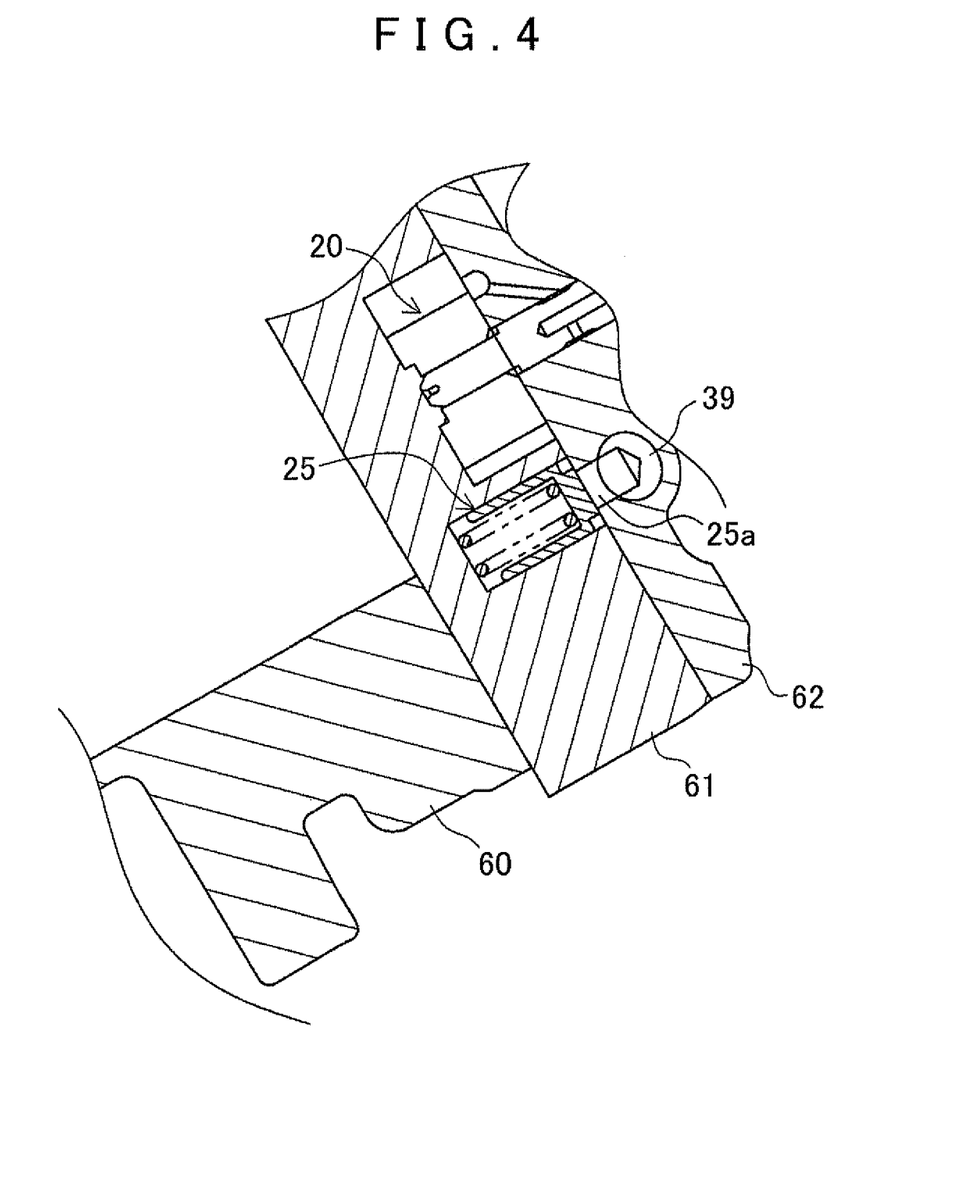
FIG. 4 is a cross-sectional view taken along a line B-B in FIG. 2.

Hereinafter, a specific preferred embodiment of a vehicle drive system according to the present invention will be described in detail based on the drawings. The present embodiment is an example that applies the present invention to a drive system installed in a hybrid vehicle. The vehicle drive system according to the present embodiment will be described with reference to FIGS. 1 to 4. FIG. 1 is a drawing that shows the constitution of a hydraulic circuit of the drive system according to the embodiment. FIG. 2 is a drawing that shows the schematic constitution near a cover of a motor generator MG2 of the vehicle drive system as viewed from a front planetary gear unit side. FIG. 3 is a cross-sectional view taken along a line A-A in FIG. 2. FIG. 4 is a cross-sectional view taken along a line B-B in FIG. 2.

As shown in FIG. 1, a drive system 11 according to the present embodiment includes a hydraulic control device 10, a motor generator MG1, a front planetary gear unit 12, a motor generator MG2, and a rear planetary gear unit 13. The hydraulic control device 10 includes an oil pump 20, an oil cooler 21, a cooler circuit 22, a motor cooling circuit 23, a lubricating circuit 24, and a relief valve 25. The majority of the hydraulic control device 10 is incorporated within the drive system 11. The hydraulic control device 10 enables oil (ATF) to be supplied to the motor generators MG1, MG2, and the planetary gear units 12, 13 inside the drive system 11. Note that, in the drive system 11, power from an engine not shown in the drawing and power from the motor generator MG2 is output through the front planetary gear unit 12 and the rear planetary gear unit 13.

The oil pump 20 suctions oil accumulated in an oil pan 26 and supplies the oil to the circuits 22, 23, 24. As the oil pump 20, one of a mechanical oil pump driven by the engine (not shown in the drawing) and an electric oil pump driven by an electric motor (not shown in the drawing), or both the mechanical oil pump and the electric oil pump may be provided. In the present embodiment, the mechanical oil pump is used as the oil pump 20 (see FIG. 4). The oil pump 20 is accommodated inside a cover 61 of the motor generator MG2 (see FIG. 4). The oil pump 20 is designed to suction oil from an intake port 20a and discharge oil from a discharge port 20b. The oil pump 20 is connected to a strainer 27 through an intake oil passage 30.

The strainer 27 is provided between the oil pan 26 and the intake port 20a of the oil pump 20. When the oil pump 20 suctions oil accumulated in the oil pan 26, the strainer 27 serves as a filter for removing foreign matter contained in the oil.

The strainer 27 and the intake port 20a of the oil pump 20 are connected through the intake oil passage 30.

The discharge port 20b of the oil pump 20 is connected to a supply oil passage 31. The supply oil passage 31 is provided inside the cover 61 of the motor generator MG2. The cooler circuit 22 and the lubricating circuit 24 are connected in parallel with respect to the supply oil passage 31. Specifically, at a connection portion 32, the supply oil passage 31, the cooler circuit 22, and the lubricating circuit 24 are connected. Thus, oil flowing through the supply oil passage 31 branches at the connection portion 32 and respectively flows to the cooler circuit 22 and the lubricating circuit 24. As shown in FIG. 3, the connection portion 32 is formed by spaces that are formed between the cover 61 of the motor generator MG2 and a case 60. In other words, the cover 61 of the motor generator MG2 is provided with part of the connection portion 32. In addition, the cover 61 is provided with a bearing on one end of the motor generator MG2. Note that the case 60 is provided with a bearing on another end of the motor generator MG2.

The cooler circuit 22 is a hydraulic circuit that supplies oil to the oil cooler 21 to cool the oil. The cooler circuit 22 includes the oil cooler 21, a cooler oil passage 33 that is formed inside the case 60 of the drive system 11, a cooler hose 34 that connects the cooler oil passage 33 to the entrance of the oil cooler 21, and a cooler hose 35 that connects the exit of the oil cooler 21 to a main oil passage 36 of the motor cooling circuit 23. The oil cooler 21 and the cooler hoses 34, 35 among the cooler circuit 22 are provided outside the drive system 11. Therefore, as shown in FIGS. 1 and 2, the case 60 of the drive system 11 is formed with ports 65, 66 that connect to the cooler hoses 34, 35. Thus, oil discharged to outside the case 60 from the port 65 and cooled by the oil cooler 21 is returned to inside the case 60 through the port 66.

As shown in FIG. 1, the motor cooling circuit 23 is connected in series on the downstream side of the cooler circuit 22. Thus, oil cooled by the oil cooler 21 is supplied in this state to the motor cooling circuit 23. The motor cooling circuit 23 is a hydraulic circuit that supplies oil to the motor generators MG1, MG2 to cool the motor generators MG1, MG2. The motor cooling circuit 23 is provided inside the case 60, and has the main oil passage 36, a first branch oil passage 37, and a second branch oil passage 38. An end of the main oil passage 36 is connected to the cooler hose 35 (port 66). Another end of the main oil passage 36 is connected to the first branch oil passage 37 and the second branch oil passage 38. In other words, the first branch oil passage 37 and the second branch oil passage 38 branch off from the main oil passage 36. Oil is supplied to the motor generator MG1 through the first branch oil passage 37, and oil is supplied to the motor generator MG2 through the second branch oil passage 38, thus respectively cooling the motor generators MG1, MG2.

The lubricating circuit 24 connected in parallel with the cooler circuit 22 to the supply oil passage 31 by the connection portion 32 is a hydraulic circuit that supplies oil to lubrication elements, such as the front planetary gear unit 12 and the rear planetary gear unit 13, inside the drive system 11. The lubricating circuit 24 is also provided inside the case 60, and has a main oil passage 39, a first branch oil passage 40, a second branch oil passage 41, and a third branch oil passage 42. An end of the main oil passage 39 is connected to the supply oil passage 31 and the cooler oil passage 33 by the connection portion 32. Another end of the main oil passage 39 is connected to the first branch oil passage 40, the second branch oil passage 41, and the third branch oil passage 42. In other words, the first branch oil passage 40, the second branch oil passage 41, and the third branch oil passage 42 branch off from the main oil passage 39.

Oil is supplied to the front planetary gear unit 12 through the first branch oil passage 40, and oil is supplied to the rear planetary gear unit 13 through the second branch oil passage 41. Note that the present embodiment provides the third branch oil passage 42, and through this oil passage 42 oil is supplied to the axial center of the motor generator MG2 to increase the cooling efficiency of the motor generator MG2. However, it is not necessary to provide this type of branch oil passage 42. Each of the branch oil passages 40, 41, 42 is respectively provided with orifices 40a, 41a, 42a. Each of the orifices 40a, 41a, 42a correspond to oil holes formed in shafts and gears. Due to the orifices 40a, 41a, 42a, the lubricating circuit 24 has greater oil passing resistance compared to the cooler circuit 22 and the motor cooling circuit 23. Thus, more oil supplied from the oil pump 20 flows toward the cooler circuit 22 at the connection portion 32.

The main oil passage 39, which is an upstream portion of the lubricating circuit 24, is also provided with an orifice 39a. As shown in FIG. 3, the orifice 39a is provided in an oil pump cover 62. In the hydraulic control device 10, the proportion of the oil flow of the motor cooling circuit 23 to the oil flow of the lubricating circuit 24 is adjusted by the orifice 39a. Thus, a required flow of oil for the motor cooling circuit 23 can be reliably secured. In the present embodiment, the diameter of the orifice 39a is determined such that the oil flow of the motor cooling circuit 23 is approximately two to four times that of the lubricating circuit 24.

As shown in FIG. 1, the relief valve 25 is provided in the main oil passage 39. Specifically, an input port 25a of the relief valve 25 is connected to the main oil passage 39 (upstream of the orifice 39a). An output port 25b of the relief valve 25 is connected to the intake port 20a of the oil pump 20 through a return oil passage 43. Thus, opening the relief valve 25 causes oil flowing from the output port 25b to return to the intake port 20a of the oil pump 20. Note that oil flowing from the output port 25b can also be returned to the oil pan 26.

Figure 5:
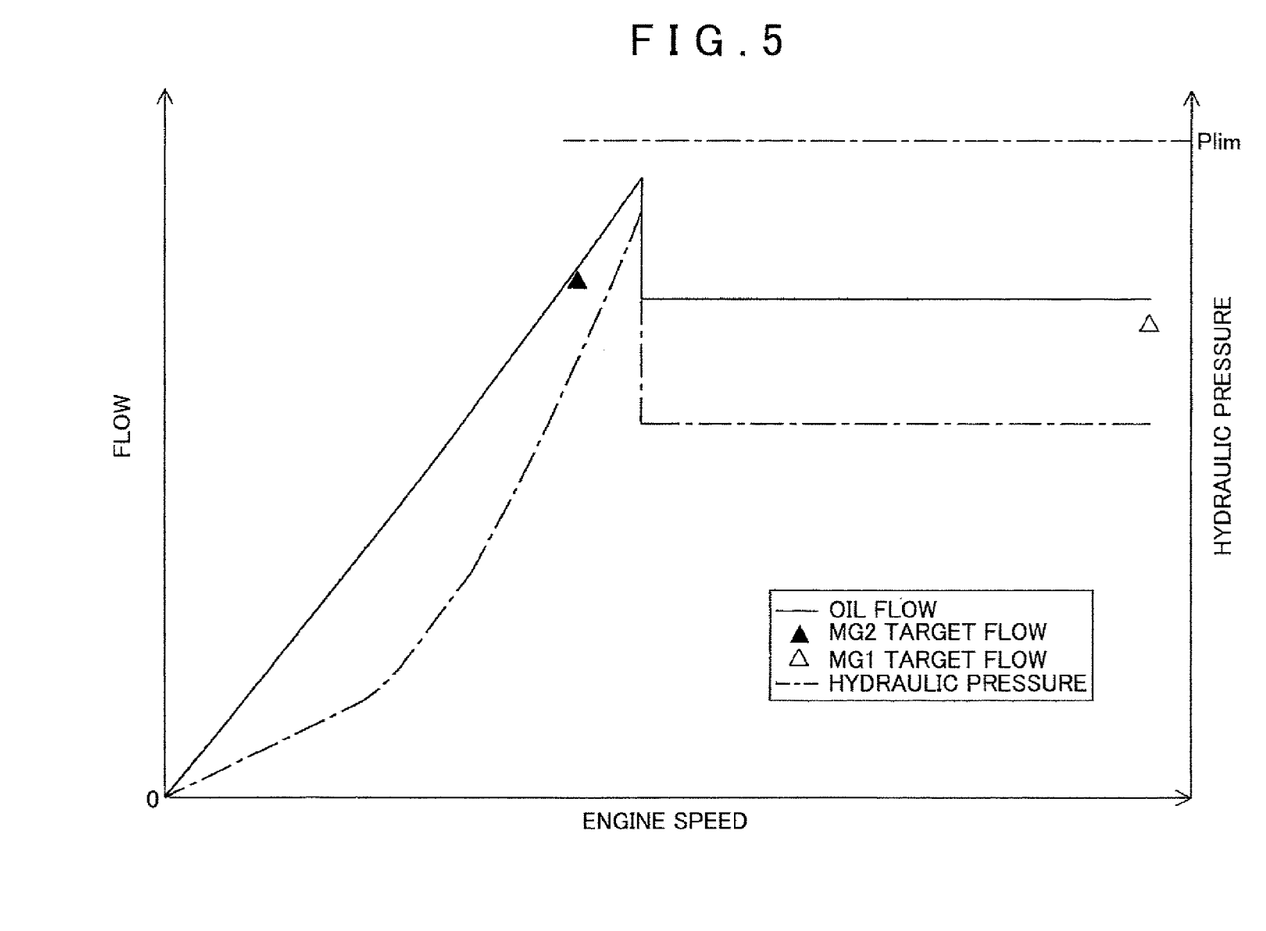
FIG. 5 is a drawing for explaining an open valve characteristic of a relief valve.

The relieve valve 25 regulates the pressure of oil supplied from the oil pump 20 such that a target flow of oil or more is supplied to the motor generators MG1, MG2 through the motor cooling circuit 23 at less than a withstand pressure limit of the circuits 22 to 24. Therefore, as shown in FIG. 5, in the relief valve 25, a valve opening pressure is set such that the relief valve 25 opens after the target flow of oil or more is supplied to the motor generator MG2 and before the pressure of oil supplied from the oil pump 20 reaches a withstand pressure limit Plim of the circuits 22 to 24. The oil flow after the relief valve 25 opens does not drop to a target flow to be supplied to the motor generator MG1. Note that FIG. 5 is a drawing for explaining an open valve characteristic of the relief valve 25. The target flows shown in FIG. 5 indicate the maximum oil flows required for cooling the motor generators MG1, MG2.

Note that, in the present embodiment, a target value of the oil flow to be supplied to the motor generator MG2 is greater than a target value of the oil flow to be supplied to the motor generator MG1. However, depending on the vehicle specifications, the target value of the oil flow to be supplied to the motor generator MG1 may be greater than or the same as the target value of the oil flow to be supplied to the motor generator MG2.

By providing this type of relief valve 25, a drop in the efficiency of the oil pump 20 and circuit damage caused by a rise in hydraulic pressure inside the circuits 22 to 24 can be reliably suppressed. Because the output port 25b of the relief valve 25 is connected to the intake port 20a of the oil pump 20, oil flowing from the relief valve 25 directly returns to the oil pump 20 without returning to the oil pan 26. This decreases the amount of oil that the oil pump 20 intakes from the oil pan 26, and the pressure loss when oil passes through the strainer 27 can be reduced accordingly. Therefore, the efficiency of the oil pump 20 can be improved. The oil pump 20 can also be downsized as a consequence, which lowers the cost of the hydraulic control device 10 and thus the drive system 11.

The relief valve 25 is used as a pressure regulating valve that regulates the hydraulic pressure in the circuits 22 to 24. Therefore, in addition to increasing the reliability and durability of the pressure regulating valve, a cost reduction can also be achieved. Consequently, it is possible to achieve improved performance and a cost reduction for the hydraulic control device 10 in the drive system 11.

As shown in FIG. 4, the relief valve 25 is disposed near the oil pump 20 inside the cover 61 of the motor generator MG2. Therefore, as shown in FIG. 3, the return oil passage 43 can be made extremely short. It is thus possible to return oil flowing from the relief valve 25 to the oil pump 20 with extremely high efficiency. Therefore, the efficiency of the oil pump 20 can be further improved because of the improved return of oil.

In addition to the oil pump 20 and the relief valve 25, the supply oil passage 31 and part of the connection portion 32 are provided inside the cover 61. Thus, components near the connection portion 32 are provided consolidated in the cover 61, which achieves good space efficiency and good vehicle installability for the hydraulic control device 10. As a consequence, a more downsized drive system 11 can be achieved.

Figure 6:
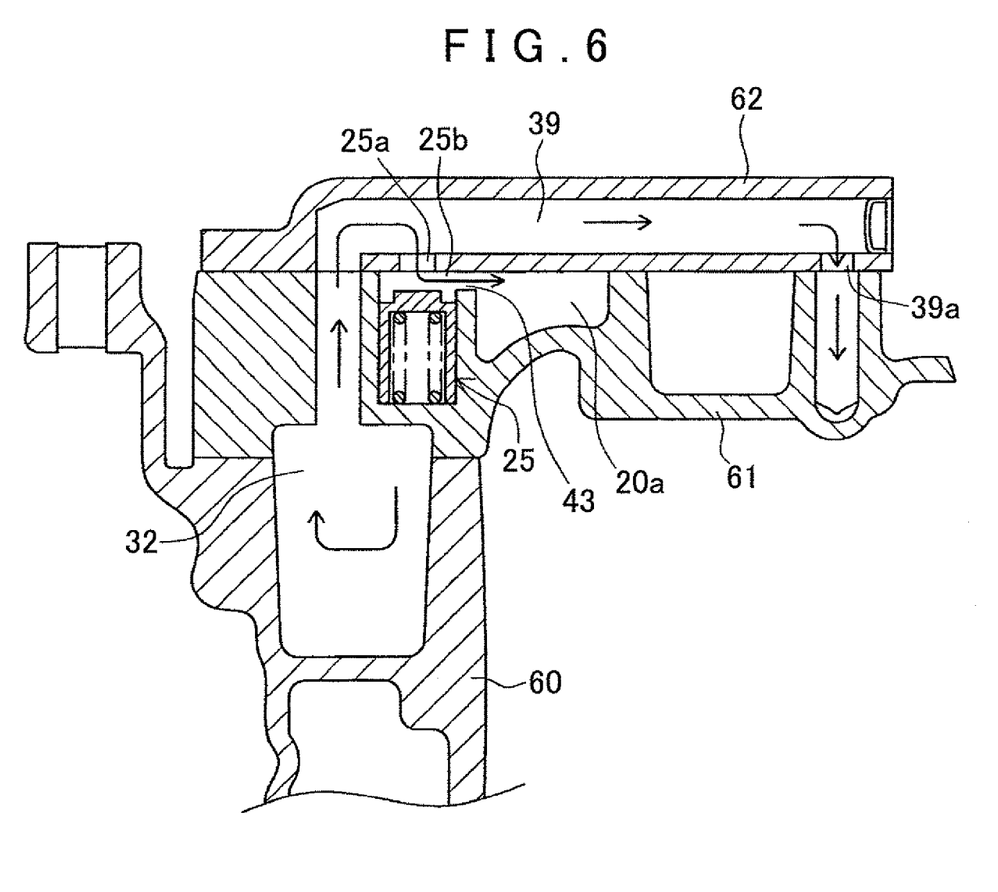
FIG. 6 is a drawing that shows the relief valve in FIG. 3 in an open state.

Next, the operation of the hydraulic control device 10 in the drive system 11 described above will be described with reference to FIG. 6. FIG. 6 is a drawing that shows the relief valve in FIG. 3 in an open state. First, when the oil pump 20 is driven, oil accumulated in the oil pan 26 is intaken by the oil pump 20 through the intake oil passage 30. Oil suctioned by the oil pump 20 passes through the strainer 27, and foreign matter is removed from the oil at such time. Oil suctioned by the oil pump 20 has its pressure increased inside the pump, and is then discharged from the oil pump 20. Oil discharged from the oil pump 20 flows into the connection portion 32 through the supply oil passage 31. Oil flowing into the connection portion 32 branches and flows to the cooler oil passage 33 and the main oil passage 39. At such time, because the orifice 39a is provided in the main oil passage 39, the oil flow in the cooler oil passage 33 is approximately two to four times the oil flow in the main oil passage 39.

Oil flowing into the cooler oil passage 33 is supplied to the oil cooler 21 through the cooler hose 34 and cooled by the oil cooler 21. The cooled oil is supplied to the motor cooling circuit 23 through the cooler hose 35. In the motor cooling circuit 23, oil flowing into the main oil passage 36 is supplied to the first branch oil passage 37 and the second branch oil passage 38. Oil supplied to the first branch oil passage 37 is then supplied to the motor generator MG1, thus cooling the motor generator MG1. Similarly, oil supplied to the second branch oil passage 38 is supplied to the motor generator MG2, thus cooling the motor generator MG2.

A flow of oil that is approximately two to four times that of the lubricating circuit 24 is supplied to the motor cooling circuit 23. Therefore, the motor generators MG1, MG2 can be efficiently cooled. Note that, because the cooler circuit 22 and the motor cooling circuit 23 have little oil passing resistance, the hydraulic pressure inside the circuits does not increase even with a large oil flow. In addition, the motor cooling circuit 23 is connected in series to the cooler circuit 22. Therefore, the motor generators MG1, MG2 can be cooled using oil that has been cooled. Therefore, a sufficient cooling effect can be obtained even if the oil flow supplied to the motor cooling circuit 23 is suppressed. Thus, the motor generators MG1, MG2 can be surely cooled even without using a high-capacity pump for the oil pump 20. A more downsized oil pump 20 compared to a conventional pump can be achieved as a consequence, which downsizes the hydraulic control device 10 and thus the drive system 11.

Meanwhile, although the lubricating circuit 24 has large oil passing resistance, most oil supplied from the oil pump 20 flows to the cooler circuit 22 and the motor cooling circuit 23, so a large amount of oil does not flow to the lubricating circuit 24. For this reason, the hydraulic pressure inside the lubricating circuit 24 does not increase. Accordingly, in the hydraulic control device 10, circuit damage can be suppressed and the efficiency of the oil pump 20 can be improved while also suppressing a hydraulic pressure increase inside the circuits.

Here, the hydraulic control of the hydraulic control device 10 is performed by the relief valve 25. Specifically, as shown in FIG. 5, the rotational speed of the oil pump 20 increases with an increase in the engine speed. Therefore, the oil flow supplied to the motor cooling circuit 23 and the in-circuit hydraulic pressure both increase. As evident from FIG. 5, an oil flow required for cooling the motor generators MG1, MG2 is secured at such time. The relief valve 25 opens after the oil flow supplied to the motor generator MG2 exceeds the target flow and before the withstand pressure limit Plim of the circuits 22 to 24 is reached. By opening the relief valve 25, the oil flow supplied to the motor cooling circuit 23 decreases and the in-circuit hydraulic pressure also decreases. Once the relief valve 25 is opened, even if the rotation of the oil pump 26 increases, the oil flow supplied to the motor cooling circuit 23 and the in-circuit hydraulic pressure remain constant. Therefore, in the hydraulic control device 10, the in-circuit hydraulic pressure does not increase to the circuit withstand pressure limit Plim.

Even after opening the relief valve 25, the target flow of oil or more can be supplied to the motor generator MG1. Note that the oil flow required for cooling the motor generator MG2 is less than the target flow shown in the drawing in a high engine speed region, and the oil flow required for cooling the motor generator MG2 is secured even after opening the relief valve 25.

Following opening of the relief valve 25, excessive oil is returned from the output port 25b of the relief valve 25 to the intake port 20a of the oil pump 20 instead of the oil pan 26 through the return oil passage 43. This decreases the amount of oil that the oil pump 20 intakes from the oil pan 26, and the pressure loss when oil passes through the strainer 27 is reduced accordingly. Therefore, the efficiency of the oil pump 20 can be improved. This point also contributes to downsizing the oil pump 20 and reducing the cost of the hydraulic control device 10.

According to the drive system 11 of the present embodiment described in detail above, the motor cooling circuit 23 is arranged in series with and downstream of the cooler circuit 22. Therefore, oil cooled by the oil cooler 21 can be directly supplied to the motor cooling circuit 23. The cooler circuit 22 is arranged parallel to the lubricating circuit 24, which has large oil passing resistance, with respect to the oil pump 20. This facilitates the flow of oil discharged from the oil pump 20 toward the cooler circuit 22 so that a large flow of oil can be supplied to the motor cooling circuit 23. Thus, since a large flow of cooled oil can be supplied to the motor cooling circuit 23, the motor generators MG1, MG2 can be efficiently cooled.

Here, because the motor cooling circuit 23 has little oil passing resistance, the in-circuit hydraulic pressure does not increase even with a large oil flow. Meanwhile, although the lubricating circuit 24 has large oil passing resistance, a large amount of oil does not flow to the lubricating circuit 24 so the in-circuit hydraulic pressure does not increase. Thus, according to the drive system 11, circuit damage can be suppressed and the efficiency of the oil pump 20 can be improved while also suppressing a hydraulic pressure increase inside the circuits.

Note that the embodiment described above is only meant to illustrate an example and does not limit the present invention in any manner; various improvements and modifications are obviously possible without departing from the scope of the invention. For example, although the embodiment described above uses the relief valve 25 as a pressure regulating valve, a pressure regulating valve other than a relief valve may also be used. In addition, the embodiment described above has a configuration that includes a return oil passage on the output port of the pressure regulating valve, but a configuration that does not include the return oil passage may also be used.

The embodiment described above illustrates an example in which the present invention is applied to the drive system 11 that includes two motor generators and planetary gear units.

However, the present invention may also be applied to a drive system that includes three or more motor generators and planetary gear units, or a drive system that includes only one motor generator and planetary gear unit.

What is claimed is:

1. A vehicle drive system, comprising:
   a motor generator;
   a gear group having a plurality of gears;
   a motor cooling circuit for cooling the motor generator;
   a lubricating circuit for lubricating the gear group;
   a cooler circuit in which an oil cooler is provided;
   an oil pump that supplies oil to each circuit; and
   a pressure regulating valve that regulates a pressure of oil supplied to each circuit; and
   an intake port of the pressure regulating valve is provided in a main oil passage of a lubricating oil passage, wherein
   the motor cooling circuit is arranged in series with and downstream of the cooler circuit, and
   the lubricating circuit is arranged parallel to the cooler circuit with respect to the oil pump.

2. The vehicle drive system according to claim 1, wherein the lubricating circuit has greater oil passing resistance than the motor cooling circuit and the cooler circuit.

3. The vehicle drive system according to claim 2, wherein an upstream portion of the lubricating circuit is provided with an orifice.

4. The vehicle drive system according to claim 3, further comprising:
   the pressure regulating valve regulates a pressure of oil discharged from the oil pump and supplied to each circuit, wherein
   the pressure regulating valve regulates such that a target flow of oil or more is supplied to the motor cooling circuit, and the pressure of the oil stays within a withstand pressure limit of each circuit.

5. The vehicle drive system according to claim 4, wherein a discharge port of the pressure regulating valve is connected to an intake port of the oil pump.

6. The vehicle drive system according to claim 5, wherein the pressure regulating valve is a relief valve that opens after the target flow of oil or more is supplied to the motor cooling circuit and before the pressure of oil supplied to each circuit reaches the withstand pressure limit of each circuit.

7. The vehicle drive system according to claim 6, wherein a cover of the motor generator is formed with an oil passage that connects to the oil pump, and at least part of a connection portion among the oil passage, the cooler circuit, and the lubricating circuit.

8. The vehicle drive system according to claim 5, wherein the cover of the motor generator is formed with the oil passage that connects to the oil pump, and at least part of a connection portion among the oil passage, the cooler circuit, and the lubricating circuit, and provided with the pressure regulating valve.

9. The vehicle drive system according to claim 8, wherein the cover of the motor generator is provided with the oil pump, and a return oil passage that connects the discharge port of the pressure regulating valve and the intake port of the oil pump.

10. The vehicle drive system according to claim 6, wherein the cover of the motor generator is formed with the oil passage that connects to the oil pump, and at least part of a connection portion among the oil passage, the cooler circuit, and the lubricating circuit, and provided with the pressure regulating valve.

11. The vehicle drive system according to claim 10, wherein the cover of the motor generator is provided with the oil pump, and a return oil passage that connects the discharge port of the pressure regulating valve and the intake port of the oil pump.

12. The vehicle drive system according to claim 2, wherein a cover of the motor generator is formed with an oil passage that connects to the oil pump, and at least part of a connection portion among the oil passage, the cooler circuit, and the lubricating circuit.

13. The vehicle drive system according to claim 1, further comprising:
    a pressure regulating valve that regulates a pressure of oil discharged from the oil pump and supplied to each circuit, wherein
    the pressure regulating valve regulates such that a target flow of oil or more is supplied to the motor cooling circuit, and the pressure of the oil stays within a withstand pressure limit of each circuit, and
    a discharge port of the pressure regulating valve is connected to an intake port of the oil pump.

14. The vehicle drive system according to claim 13, wherein
    the pressure regulating valve is a relief valve that opens after the target flow of oil or more is supplied to the motor cooling circuit and before the pressure of oil supplied to each circuit reaches the withstand pressure limit of each circuit.

15. The vehicle drive system according to claims 14, wherein
    a cover of the motor generator is formed with an oil passage that connects to the oil pump, and at least part of a connection portion among the oil passage, the cooler circuit, and the lubricating circuit.

16. The vehicle drive system according to claim 13, wherein
    the cover of the motor generator is formed with the oil passage that connects to the oil pump, and at least part of a connection portion among the oil passage, the cooler circuit, and the lubricating circuit, and provided with the pressure regulating valve.

17. The vehicle drive system according to claim 16, wherein
    the cover of the motor generator is provided with the oil pump, and a return oil passage that connects the discharge port of the pressure regulating valve and the intake port of the oil pump.

18. The vehicle drive system according to claim 14, wherein
    the cover of the motor generator is formed with the oil passage that connects to the oil pump, and at least part of a connection portion among the oil passage, the cooler circuit, and the lubricating circuit, and provided with the pressure regulating valve.

19. The vehicle drive system according to claim 18, wherein
    the cover of the motor generator is provided with the oil pump, and a return oil passage that connects the discharge port of the pressure regulating valve and the intake port of the oil pump.

* * * * *